US011991635B2

(12) United States Patent
Yang et al.

(10) Patent No.: US 11,991,635 B2
(45) Date of Patent: May 21, 2024

(54) INFORMATION SENDING AND RECEIVING METHOD AND DEVICE, TERMINAL, AND BASE STATION

(71) Applicant: DATANG MOBILE COMMUNICATIONS EQUIPMENT CO., LTD., Beijing (CN)

(72) Inventors: Meiying Yang, Beijing (CN); Deshan Miao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 564 days.

(21) Appl. No.: 17/276,009

(22) PCT Filed: Jun. 18, 2019

(86) PCT No.: PCT/CN2019/091781
§ 371 (c)(1),
(2) Date: Mar. 12, 2021

(87) PCT Pub. No.: WO2020/062955
PCT Pub. Date: Apr. 2, 2020

(65) Prior Publication Data
US 2022/0046543 A1 Feb. 10, 2022

(30) Foreign Application Priority Data
Sep. 27, 2018 (CN) .......................... 201811133657.X

(51) Int. Cl.
H04W 52/00 (2009.01)
H04W 52/02 (2009.01)
(Continued)

(52) U.S. Cl.
CPC ... *H04W 52/0235* (2013.01); *H04W 52/0232* (2013.01); *H04W 72/0446* (2013.01); *H04W 72/23* (2023.01)

(58) Field of Classification Search
CPC ......... H04W 52/0235; H04W 52/0232; H04W 72/23; H04W 72/0446
See application file for complete search history.

(56) References Cited

U.S. PATENT DOCUMENTS

| 9,445,319 B2 | 9/2016 | Choi et al. |
| 2011/0199951 A1 | 8/2011 | Kwon et al. |

(Continued)

FOREIGN PATENT DOCUMENTS

| CN | 102036346 A | 4/2011 |
| CN | 102487541 A | 6/2012 |

(Continued)

OTHER PUBLICATIONS

Ericsson, "DRX with short on-Duration and Wake-up signaling," 3GPP TSG-RAN WG2#103, R2-1811627, Gothenburg, Sweden, Aug. 20-24, 2018.

(Continued)

*Primary Examiner* — Erika A Washington
(74) *Attorney, Agent, or Firm* — Meunier Carlin & Curfman LLC

(57) ABSTRACT

Disclosed are an information sending and receiving method and device, a terminal, and a base station, used for solving the technical problem of the existing low data transmission performance. The information sending method comprises: the base station determines energy-saving configuration information of the terminal; the base station determines PDCCH detection window information; the base station sends PDCCH detection indication information to the terminal according to the PDCCH detection window information on the basis of the energy-saving configuration information of the terminal.

17 Claims, 7 Drawing Sheets

(51) Int. Cl.
*H04W 72/0446* (2023.01)
*H04W 72/23* (2023.01)

(56) References Cited

U.S. PATENT DOCUMENTS

| | | | | |
|---|---|---|---|---|
| 2015/0201375 A1* | 7/2015 | Vannithamby | ........ | H04W 16/18 |
| | | | | 370/311 |
| 2022/0039009 A1* | 2/2022 | Iyer | ........ | H04L 5/0098 |

FOREIGN PATENT DOCUMENTS

| | | | | | |
|---|---|---|---|---|---|
| CN | 102932822 | A | | 2/2013 | |
| CN | 104244380 | A | | 12/2014 | |
| CN | 104472007 | A | | 3/2015 | |
| CN | 109803409 | A | * | 5/2019 | |
| CN | 110351041 | A | * | 10/2019 | ........... H04L 5/0048 |
| EP | 2945418 | A1 | | 11/2015 | |

OTHER PUBLICATIONS

Mediatek Inc., "UE Behaviour of WUS Monitoring," 3GPP TSG-RAN WG2 Meeting #103, R2-1811177, Gothenburg, Sweden, Aug. 20-24, 2018.
Intel Corporation, "Enhancements to NR DL signals and channels for unlicensed operation," 3GPP TSG RAN WG1 Meeting #94, R1-1808683, Gothenburg, Sweden, Aug. 20-24, 2018.
International Search Report for International Application No. PCT/CN2019/091781 dated Aug. 28, 2019.

* cited by examiner

INFORMATION SENDING AND RECEIVING METHOD AND DEVICE, TERMINAL, AND BASE STATION

CROSS-REFERENCE OF RELATED APPLICATIONS

The present application is a National Stage of International Application PCT No. PCT/CN2019/091781 filed on Jun. 18, 2019, which claims priority from Chinese Patent Application No. 201811133657.X, filed with the Chinese Patent Office on Sep. 27, 2018 and entitled "Information Sending and Receiving Method and Device, Terminal, and Base Station", both of which are hereby incorporated by reference in their entireties.

FIELD OF INVENTION

The present application relates to the field of wireless communications, and in particular to a method and device for sending and receiving information, a terminal and a base station.

BACKGROUND

With the development of wireless communication systems, terminal types and service types are diversified, and requirements of saving terminal power, saving network resources and satisfying various service types coexist. Here, the Discontinuous receive (DRX) is an important technical solution for UE power saving. Under this solution, user equipment (UE) enters a DRX sleep (DRX-OFF) state when there is no need to send and receive data. At the same time, some components, such as radio frequency or baseband, of the UE is in an off or low power consumption state, so as to save the power. Once there are data to be sent and received, the UE needs to be woken up to send and receive the data. Further, in a DRX idle (DRX-Idle) state, the UE periodically detects paging at the time of paging occasion (PO), and can enter a sleep mode after completing the detection, to thereby save the power.

Further, a combination of a current wake-up mechanism and DRX mechanism of the UE can further reduce the power consumption of the UE. The wake-up mechanism may be indicated based on a wake-up signal (WUS), or may be indicated based on a downlink control indication (DCI). The WUS indicates whether the UE performs physical downlink control channel (PDCCH) detection. Before the UE enters a DRX activation (DRX-On) state, the UE receives the WUS firstly. If the WUS indicates that the UE needs to perform the PDCCH detection, the UE wakes up at the moment of the DRX-On state to receive and detect PDCCH. Otherwise, the UE continues to enter the sleep state after detecting the WUS at or before the moment of the DRX-On state, thereby further saving power.

Based on the above technologies, the existing wake-up mechanism may have the following problems: taking the WUS as an example, the WUS is sent before each DRX-on moment, and if the UE has no data to be received before the WUS is sent (that is, before the DRX-on state), the UE will not wake up at the DRX-on moment; at this time, if the UE has the data that arrives at the DRX-on moment, the UE cannot receive the data because it is not awakened, reducing data transmission performance. On the other hand, the similar problem also exists during DRX-Off. The similar problem also exists for the PDCCH detection indicated by the DCI.

SUMMARY

The embodiments of the present application provide a method and device for sending and receiving information, a network device and a terminal, so as to solve the existing technical problems of low data transmission performance.

The specific technical solutions provided by the embodiments of the present application are as follows.

An embodiment of the present application provides a method for sending data, including: determining, by a base station, energy-saving configuration information of a terminal; determining, by the base station. PDCCH detection window information; and sending, by the base station, PDCCH detection indication information to the terminal according to the PDCCH detection window information on the basis of the energy-saving configuration information of the terminal.

In the embodiments of the present application, the base station determines the energy-saving configuration information of the terminal and determines the PDCCH detection window information. The base station sends the PDCCH detection indication information to the terminal according to the PDCCH detection window information in the case when the terminal can support the power-saving configuration on the basis of the power-saving configuration information, so that the terminal can execute an indication of the PDCCH detection (that is, whether to perform the PDCCH detection in the PDCCH detection window, and the period and frequency for performing the PDCCH detection, etc.) according to the PDCCH detection window information. The embodiments of the present application introduce the PDCCH detection window, so that the terminal can be awakened to perform the PDCCH detection during the DRX-on period and DRX-off period, i.e., within any PDCCH detection window in the DRX, where the DRX can be configured periodically or non-periodically. Alternatively, the terminal is not configured in the DRX state, and the terminal can also perform the PDCCH detection in any PDCCH detection window. In this way, on the basis of reducing the energy consumption of the terminal to a certain extent, the delay of the UE can also be reduced, and the user-perceived throughput of the terminal is improved.

Optionally, the energy-saving configuration information includes: whether the terminal has an ability to support an energy-saving configuration, and/or whether the terminal is configured to support an energy-saving configuration, and/or an energy-saving mechanism of the terminal, and/or a wake-up mechanism of the terminal.

Optionally, the PDCCH detection window information includes: a wake-up mechanism of the terminal, and/or start time of a PDCCH detection window, and/or duration of the PDCCH detection window, and/or end time of the PDCCH detection window, and/or a position of at least one PDCCH detection time unit in the PDCCH detection window, and/or the number of PDCCH detection time units in the PDCCH detection window, and/or an interval of PDCCH detection time units in the PDCCH detection window.

Optionally, determining, by the base station, energy saving configuration information of a terminal, includes: receiving, by the base station, the energy-saving configuration information configured by the terminal autonomously; or, configuring, by the base station, the energy-saving configuration information for the terminal and sending the energy-saving configuration information to the terminal; or, pre-appointing, by the base station, the energy-saving configuration information with the terminal.

Optionally, determining, by the base station, PDCCH detection window information, includes: receiving, by the base station, the PDCCH detection window information configured by the terminal autonomously; or, configuring, by the base station, the PDCCH detection window information for the terminal and sending the PDCCH detection window information to the terminal; or, pre-appointing, by the base station, the PDCCH detection window information with the terminal.

Optionally, a configuration mode of the energy-saving configuration information is static configuration, or semi-static configuration, or dynamic configuration; and/or a configuration mode of the PDCCH detection window information is static configuration, or semi-static configuration, or dynamic configuration.

Optionally, sending, by the base station, PDCCH detection indication information to the terminal, includes:
  sending, by the base station. PDCCH detection indication information corresponding to a PDCCH detection window in a first time unit before the PDCCH detection window;
  or sending, by the base station, PDCCH detection indication information corresponding to the PDCCH detection window in a second time unit at the start of the PDCCH detection window;
  or sending, by the base station, PDCCH detection indication information corresponding to the PDCCH detection window in a third time unit within the PDCCH detection window:
  or sending, by the base station, PDCCH detection indication information corresponding to a next PDCCH detection window in a fourth time unit within the PDCCH detection window;
  or sending, by the base station, PDCCH detection indication information corresponding to a next PDCCH detection window in a fifth time unit at the end of the PDCCH detection window.

A method for receiving information provided by an embodiment of the present application includes:
  determining, by a terminal, energy-saving configuration information;
  determining, by the terminal, PDCCH detection window information; and
  receiving, by the terminal, PDCCH detection indication information according to the PDCCH detection window information on the basis of the energy-saving configuration information.

Optionally, after the terminal receives the PDCCH detection indication information according to the PDCCH detection window information on the basis of the energy-saving configuration information, the method further includes:
  performing, by the terminal, a PDCCH detection according to the PDCCH detection window information on the basis of the PDCCH detection indication information.

Optionally, the energy-saving configuration information includes:
  whether the terminal has an ability to support an energy-saving configuration, and/or whether the terminal is configured to support an energy-saving configuration, and/or an energy-saving mechanism of the terminal, and/or a wake-up mechanism of the terminal.

Optionally, the PDCCH detection window information includes:
  a wake-up mechanism of the terminal, and/or start time of a PDCCH detection window, and/or duration of the PDCCH detection window, and/or end time of the PDCCH detection window, and/or a position of at least one PDCCH detection time unit in the PDCCH detection window, and/or the number of PDCCH detection time units in the PDCCH detection window, and/or an interval of PDCCH detection time units in the PDCCH detection window.

Optionally, determining, by the terminal, the energy saving configuration information of the terminal, includes:
  receiving, by the terminal, the energy-saving configuration information configured by the base station for the terminal;
  or, configuring, by the terminal, the energy-saving configuration information autonomously and sending the energy-saving configuration information to the base station;
  or, pre-appointing, by the terminal, the energy-saving configuration information with the base station.

Optionally, determining, by the terminal, PDCCH detection window information, includes:
  receiving, by the terminal, the PDCCH detection window information configured by the base station for the terminal;
  or, configuring, by the terminal, the PDCCH detection window information autonomously and sending the PDCCH detection window information to the base station;
  or, pre-appointing, by the terminal, the PDCCH detection window information with the base station.

Optionally, a configuration mode of the energy-saving configuration information is static configuration, or semi-static configuration, or dynamic configuration; and/or
  a configuration mode of the PDCCH detection window information is static configuration, or semi-static configuration, or dynamic configuration.

Optionally, receiving, by the terminal, PDCCH detection indication information sent by a base station, includes:
  receiving, by the terminal. PDCCH detection indication information corresponding to a PDCCH detection window in a first time unit before the PDCCH detection window;
  or receiving, by the terminal, PDCCH detection indication information corresponding to the PDCCH detection window in a second time unit at the start of the PDCCH detection window;
  or receiving, by the terminal, PDCCH detection indication information corresponding to the PDCCH detection window in a third time unit within the PDCCH detection window;
  or receiving, by the terminal, PDCCH detection indication information corresponding to a next PDCCH detection window in a fourth time unit within the PDCCH detection window;
  or receiving, by the terminal, PDCCH detection indication information corresponding to a next PDCCH detection window in a fifth time unit at the end of the PDCCH detection window.

A device for sending information provided by an embodiment of the present application includes:
  a processing unit configured to determine energy-saving configuration information of a terminal, and determine PDCCH detection window information; and
  a transceiver unit configured to send PDCCH detection indication information to the terminal according to the PDCCH detection window information on the basis of the energy-saving configuration information of the terminal.

A device for receiving information provided by an embodiment of the present application includes:
- a processing unit configured to determine energy-saving configuration information, and determine PDCCH detection window information; and
- a transceiver unit configured to receive PDCCH detection indication information according to the PDCCH detection window information on the basis of the energy-saving configuration information.

Optionally, the processing unit is further configured to:
perform a PDCCH detection according to the PDCCH detection window information on the basis of the PDCCH detection indication information.

A base station provided by an embodiment of the present application includes: a processor, a memory, a transceiver, and a bus interface, where the processor, the memory and the transceiver are connected through the bus interface:
- the processor is configured to determine energy-saving configuration information of a terminal, and determine PDCCH detection window information;
- the transceiver is configured to send PDCCH detection indication information to the terminal according to the PDCCH detection window information on the basis of the energy-saving configuration information of the terminal;
- the memory is configured to store one or more executable programs and store data used by the processor when performing operations; and
- the bus interface is configured to provide one or more interfaces.

A terminal provided by an embodiment of the present application includes: a processor, a memory, a transceiver, and a bus interface, where the processor, the memory and the transceiver are connected through the bus interface;
- the processor is configured to determine energy-saving configuration information, and determine PDCCH detection window information;
- the transceiver is configured to receive PDCCH detection indication information according to the PDCCH detection window information on the basis of the energy-saving configuration information;
- the memory is configured to store one or more executable programs and store data used by the processor when performing operations; and
- the bus interface is configured to provide one or more interfaces.

Another embodiment of the present application provides a computing device, which includes a memory and a processor, where the memory is configured to store program instructions, and the processor is configured to invoke the program instructions stored in the memory and perform any one of the above-mentioned methods in accordance with the obtained program instructions.

Another embodiment of the present application provides a computer storage medium storing the computer executable instructions which are configured to cause a computer to perform any one of the above-mentioned methods.

BRIEF DESCRIPTION OF THE DRAWINGS

In order to illustrate the technical solutions in the embodiments of the present application or in the related art more clearly, the accompanying figures which need to be used in describing the embodiments will be introduced below briefly. Obviously the accompanying figures described below are only some embodiments of the present application.

DETAILED DESCRIPTION OF THE EMBODIMENTS

The embodiments of the present application provide a feedback method and device of channel state information, a network device and a terminal, so as to solve the technical problem that the existing feedback method of channel state information is expensive and even affects the system performance.

The system operating environment of the present application will be introduced below. The technology described in the present application can be applicable to the LTE system (such as LTE/LTE-A/eLTE system) or other wireless communication systems that use various wireless access technologies, e.g., code division multiple access (CDMA), frequency division multiple access (FDMA), time division multiple access (TDMA), orthogonal frequency division multiple access (OFDMA), single carrier-frequency division multiple access (SC-FDMA) and other access technology systems; and also applicable to subsequent evolution systems, such as the fifth generation (5G) (which may also be called a New Radio (NR)) system, etc., and can also be extended to similar wireless communication systems, such as wifi, wimax, and 3gpp-related cellular systems.

Figure 1:
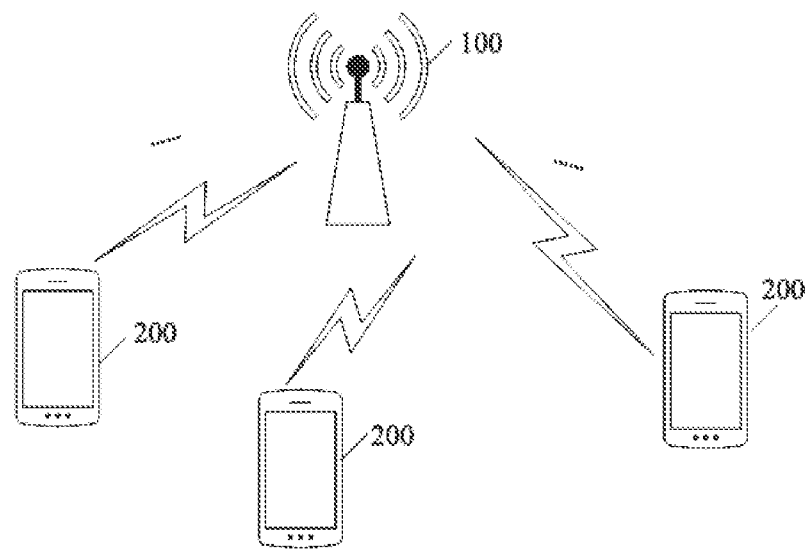
FIG. 1 is a system architecture diagram provided by an embodiment of the present application.

FIG. 1 illustrates a schematic diagram of a communication system. The communication system includes at least one base station 100 (only one is shown) and one or more terminals 200 connected to the base station 100.

The base station 100 may be a device that can communicate with the terminals 200. The base station 100 may be any device with wireless transceiver functions, including but not limited to: a base station NodeB, an evolved base station eNodeB, a base station in the fifth generation (5G) communication system, a base station in a future communication system, an access node in the WiFi system, a wireless relay node, a wireless backhaul node, etc. The base station 100 may also be a wireless controller in the Cloud Radio Access Network (CRAN) scenario. The base station 100 may also be a base station in a 5G network or a base station in a future evolution network; or may also be a wearable device or a vehicle-mounted device, etc. The base station 100 may also be a small station, a transmission reference point (TRP), etc. Of course, the present application is not limited thereto.

The terminal 200 is a device with the wireless transceiver function, and can be deployed on land, including indoor or outdoor, handheld, wearable or vehicle-mounted; or can also be deployed on the water (such as ship, etc.); or can also be deployed in the air (e.g., on the airplane, balloon and satellite, etc.). The terminal may be: a mobile phone, a Pad, a computer with wireless transceiver function, a virtual reality (VR) terminal, an augmented reality (AR) terminal, a wireless terminal in the industrial control, a wireless terminal in the self-driving, a wireless terminal in the remote medical, a wireless terminal in the smart grid, a wireless terminal in the transportation safety, a wireless terminal in the smart city, or a wireless terminal in the smart home, etc. The embodiments of the present application do not limit the application scenarios. The terminal may be referred to as user equipment (UE), an access terminal, a UE unit, a UE station, a mobile station, a mobile, a remote station, a remote terminal, a mobile device, a UE terminal, a terminal, a wireless communication device, a UE agent or UE apparatus, etc.

Figure 2A:
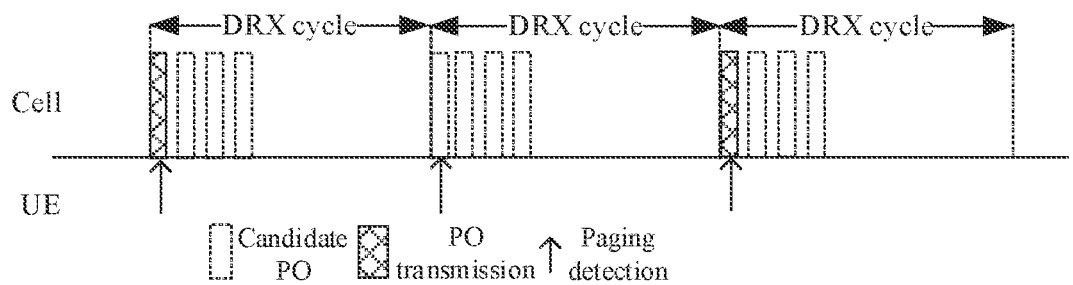
FIG. 2A is a schematic diagram of a DRX cycle in an RRC idle state in the related art.
Figure 2B:
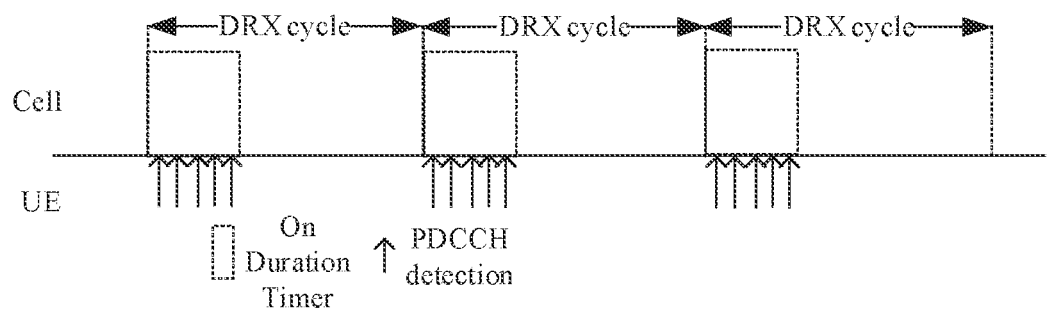
FIG. 2B is a schematic diagram of a DRX cycle in an RRC connected state in the related art.

FIGS. 2A and 2B show schematic diagrams of the DRX cycle in the related art. FIG. 2A shows the DRX in an RRC idle state. When the RRC is in the idle state, the terminal enters a sleep state with extremely low power consumption. The terminal wakes up periodically and detects a Paging signal at a PO moment. After data have been received and transmitted, the terminal enters the sleep state with extremely low power consumption again. FIG. 2B shows the DRX in an RRC connected state. When the RRC is in the connected state, in one DRX cycle, the terminal performs PDCCH detection within the duration of DRX-on, and the terminal enters the sleep state and does not perform the PDCCH detection during the time outside DRX-on, i.e., DRX-off.

Figure 3A:
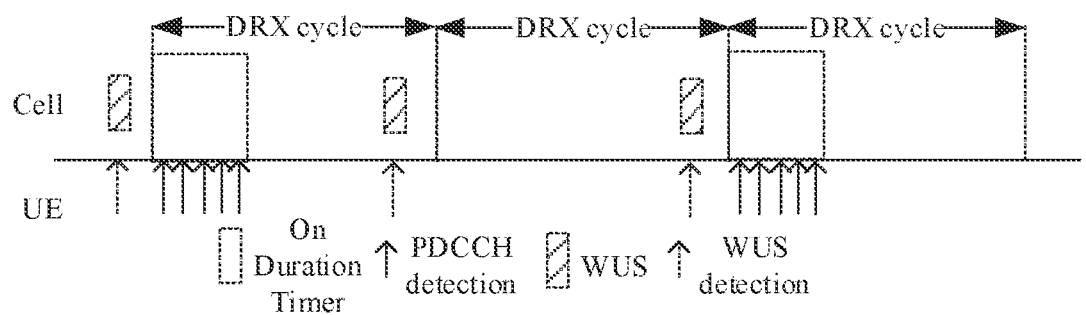
FIG. 3A shows a wake-up mechanism based on WUS reception and transmission in the related art.
Figure 3B:
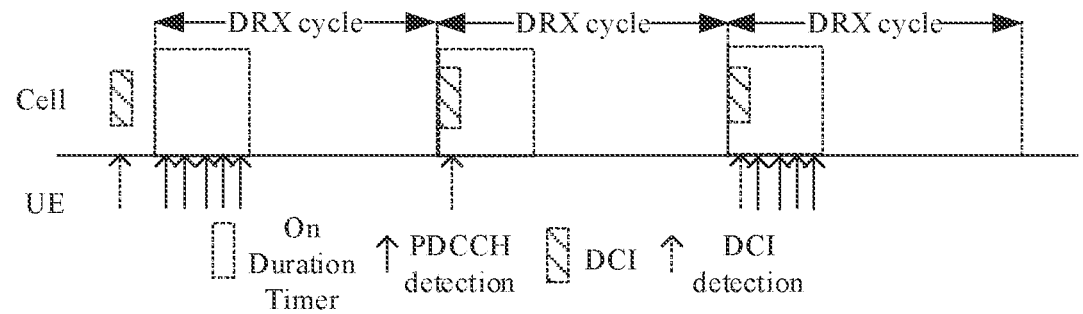
FIG. 3B shows a wake-up mechanism based on a DCI detection in the related art.

Wake-up mechanisms under DRX in the related art are shown in FIGS. 3A and 3B. FIG. 3A shows a wake-up mechanism based on WUS reception and transmission. As shown in FIG. 3A, the terminal receives a WUS before the DRX-on. If the WUS instructs the terminal to retrieve the PDCCH, the terminal wakes up at the beginning of the DRX-on, receives and detects the PDCCH, and enters the sleep state after the DRX-on ends, to wait for the arrival of the next DRX-on. If the WUS instructs terminal not to retrieve the PDCCH, the terminal will directly enter the sleep state after the WUS has been detected, to thereby save power. FIG. 3B shows a wake-up mechanism based on DCI detection. The terminal receives the DCI before the DRX-on, or the terminal receives the DCI when the DRX-on starts. If the DCI indicates that the terminal needs the PDCCH detection, the terminal wakes up within the duration of DRX-on and receives and detects the PDCCH, and enters the sleep state after the DRX-on ends, to wait for the arrival of the next DRX-on. If the DCI instructs the terminal not to perform the PDCCH detection, the terminal will directly enter the sleep state after the DCI has been detected, to thereby save power.

As can be seen, in the related art, the PDCCH detection under the DRX can be performed only in the DRX-on state, but the start/end time and the duration of DRX-on are periodic and relatively fixed, and cannot flexibly cope with the situation where the terminal receives the data. In addition, for the wake-up mechanism under DRX, the terminal can only receive the wake-up signal before or when the DRX-on starts, so as to determine whether the terminal performs the PDCCH detection within the duration of DRX-on. When the wake-up signal instructs the terminal to perform the PDCCH detection within the duration of DRX-on, the terminal cannot receive the data and can only wait for the next DRX cycle to perform data processing. At the same time, it cannot cope with the situation where the terminal receives the data at other times such as DRX-off, so it has limitations.

Figure 4:
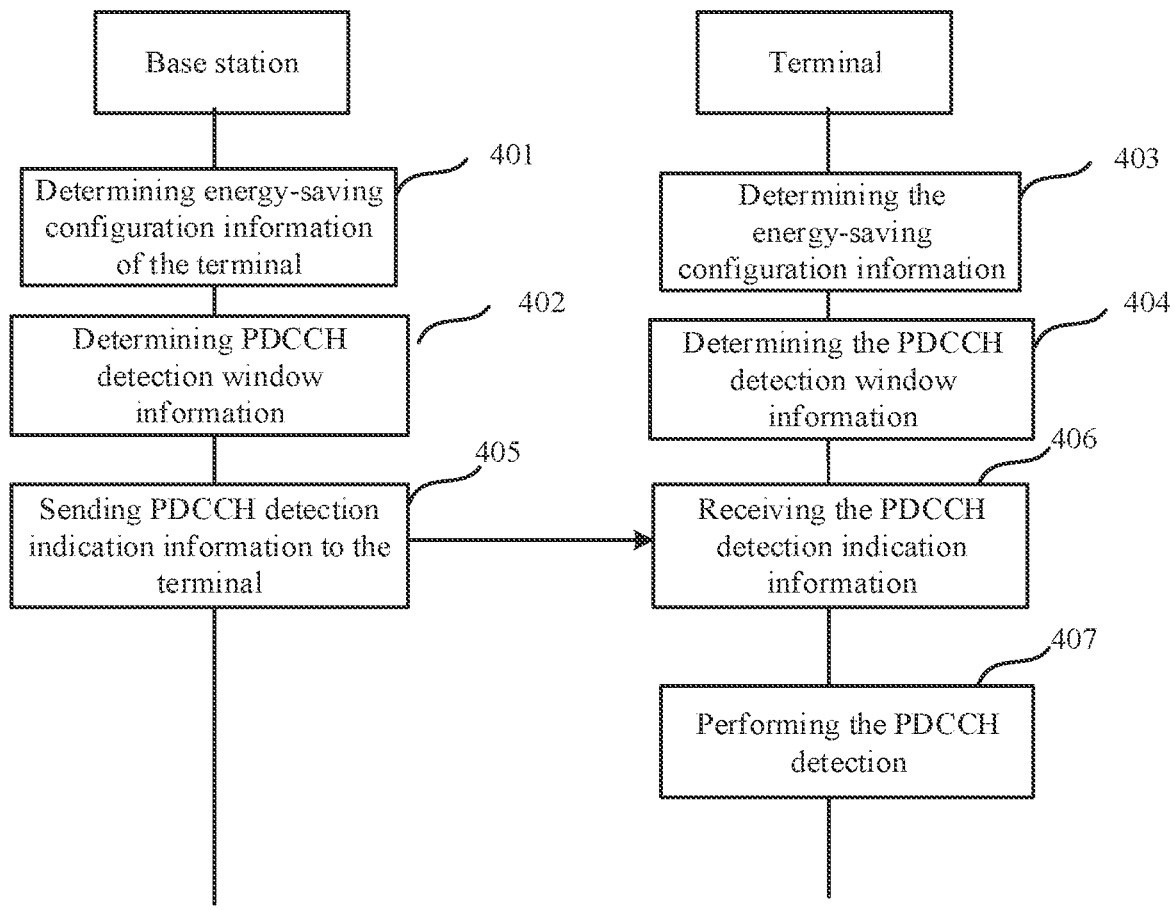
FIG. 4 shows a schematic flowchart of a method for sending and receiving information provided by an embodiment of the present application.

For the above problems, as shown in FIG. 4, the present application provides a method for sending and receiving information, including following steps.

Step 401: a base station determines energy-saving configuration information of a terminal.

Step 402: the base station determines PDCCH detection window information.

Step 403: the terminal determines the energy-saving configuration information.

Step 404: the terminal determines the PDCCH detection window information.

Step 405: the base station sends PDCCH detection indication information to the terminal according to the PDCCH detection window information on the basis of the energy-saving configuration information of the terminal.

Step 406: the terminal receives the PDCCH detection indication information according to the PDCCH detection window information on the basis of the energy-saving configuration information.

Step 407: the terminal performs PDCCH detection according to the PDCCH detection window information on the basis of the PDCCH detection indication information.

It should be noted that the above step 401 and step 402 may be performed before the step 403 and step 404; or the step 401 and step 402 may be performed after the step 403 and step 404; or the step 401 and step 402 may be performed at the same time as the step 403 and step 404, that is, the base station and the terminal may also determine the energy-saving configuration information of the terminal and the PDCCH detection window information at the same time. The above step numbers are only for convenience of description and do not limit the time sequence.

In the embodiments of the present application, the base station determines the energy-saving configuration information of the terminal and determines the PDCCH detection window information. The base station sends the PDCCH detection indication information to the terminal according to the PDCCH detection window information in the case when the terminal can support the power-saving configuration on the basis of the power-saving configuration information, so that the terminal can execute an indication of the PDCCH detection (that is, whether to perform the PDCCH detection in the PDCCH detection window, and the period and frequency for performing the PDCCH detection, etc.) according to the PDCCH detection window information. The embodiments of the present application introduce the PDCCH detection window, so that the terminal can be awakened to perform the PDCCH detection during the DRX-on period and DRX-off period, i.e., within any PDCCH detection window in the DRX, where the DRX can be configured periodically or non-periodically. Alternatively, the terminal is not configured in the DRX state, and the terminal can also perform the PDCCH detection in any PDCCH detection window. In this way, on the basis of reducing the energy consumption of the terminal to a certain extent, the delay of the UE can also be reduced, and the user-perceived throughput of the terminal is improved.

The energy-saving configuration information in the above steps includes:
whether the terminal has the ability to support the energy-saving configuration, and/or whether the terminal is configured to support the energy-saving configuration, and/or an energy-saving mechanism of the terminal, and/or a wake-up mechanism of the terminal.

The energy-saving configuration information in the embodiments of the present application may include: whether the terminal has the ability to support the energy-saving configuration, and/or whether the terminal is configured to support the energy-saving configuration. If the terminal has the ability to support the energy-saving configuration and is configured to support the energy-saving configuration, the base station may send the PDCCH detection indication information to the terminal. If the terminal has the ability to support the energy-saving configuration but is not configured to support the energy-saving configuration, the terminal may be set to support the energy-saving configuration, and then the base station sends the PDCCH detection indication information to the terminal. If the terminal does not have the ability to support the energy-saving configuration, the base station cannot send the PDCCH detection indication information to the terminal, that is, no subsequent processes such as wake-up and sleep will be performed.

The energy-saving configuration information may also include the energy-saving mechanism of the terminal, which may include but not limited to the wake-up mechanisms of the terminal. The wake-up mechanisms of the terminal may include the wake-up mechanisms based on WUS transmission and reception, and the wake-up mechanism based on Dynamic Signaling Indication (DCI) detection. In the wake-up mechanism based on the WUS transmission and reception, the base station can send a WUS to the terminal, where the WUS indicates whether the terminal needs to wake up to perform PDCCH detection; or the base station may send at the moment of WUS transmission, indicating that the terminal needs to wake up to perform PDCCH detection; if the base station does not send at the moment of WUS transmission, it indicates that the terminal does not need to wake up to perform PDCCH detection. In the wake-up mechanism based on the DCI detection, the base station sends the DCI to the terminal to indicate whether the terminal needs to perform PDCCH detection. The base station identifies whether PDCCH detection is required through the DCI. It can identify whether PDCCH detection is required through one or more bits carried in the DCI, or can identify whether PDCCH detection is required by scrambling the DCI.

The PDCCH detection window information in the above steps includes:
the wake-up mechanism of the terminal, and/or the start time of a PDCCH detection window, and/or the duration of the PDCCH detection window, and/or the end time of the PDCCH detection window, and/or the position of at least one PDCCH detection time unit in the PDCCH detection window, and/or the number of PDCCH detection time units in the PDCCH detection window, and/or the interval of PDCCH detection time units in the PDCCH detection window.

The PDCCH detection window information in the embodiments of the present application may also include the wake-up mechanism of the terminal. In other words, the wake-up mechanism of the terminal can be included in the PDCCH detection window information, or can be included in the energy-saving configuration information, which is not limited here.

The PDCCH detection window information further includes the time information of the PDCCH detection window, such as the start time of the PDCCH detection window, the end time of the PDCCH detection window, and the duration of the PDCCH detection window. The PDCCH detection window information can only include the start time of the PDCCH detection window and the end time of the PDCCH detection window; or can only include the start time of the PDCCH detection window and the duration of the PDCCH detection window; or can only include the end time of the PDCCH detection window and the duration of the PDCCH detection window; or can include the start time of the PDCCH detection window, the end time of the PDCCH detection window and the duration of the PDCCH detection window, which is not limited here.

Here, the duration of the PDCCH detection window refers to the time length in which the terminal needs to perform PDCCH detection and/or the time length in which the terminal does not perform PDCCH detection. And, the durations of the PDCCH detection windows may be equal or unequal. For example, the duration of the first PDCCH detection window is N, the duration of the second PDCCH detection window is M, and M is not equal to N.

In a possible specific implementation, the duration of the PDCCH detection window can be configured according to the DRX cycle. For example, if the duration of the PDCCH detection window may be configured as A during the DRX-on period and the duration of the PDCCH detection window may be configured as B during the DRX-off period, A may be greater than B, or B may be greater than A. For another example, the duration of the first PDCCH detection window configured by the terminal is C, and the wake-up mechanism indicates that the PDCCH detection does not need to be performed in the first PDCCH detection window. If the UE does not need to perform the PDCCH detection in the PDCCH detection windows after the first PDCCH detection window, the UE can extend the duration of the first PDCCH detection window to D, where D is greater than or equal to C.

In a possible specific implementation, the duration of the PDCCH detection window can be configured according to the size of the service transmission data packet. For example, if the service is transmitted based on small packets, the duration of the PDCCH detection window can be configured as E; if the service is transmitted based on large packets, the duration of the PDCCH detection window can be configured as F, where F is greater than or equal to E.

In a possible specific implementation, the duration of the PDCCH detection window can be configured according to the load of a service. If the load of the service is heavy, the duration of the PDCCH detection window can be configured as G; if the load of the service is light, the duration of the PDCCH detection window can be configured as H, where H is greater than or equal to G.

In a possible specific implementation, the duration of the PDCCH detection window can be configured according to a service type. If the service type is sensitive to time, the duration of the PDCCH detection window can be configured as I; if the service type can tolerate a certain delay, the duration of the PDCCH detection window can be configured as J, where J is greater than or equal to I.

In a possible specific implementation, the duration of the PDCCH detection window can be configured according to the scheduling of the base station. For example, the time interval of the scheduling of the base station is L, the duration of the PDCCH detection window can be configured as L.

Furthermore, in embodiments of the present application, the start time of the PDCCH detection window can be any time during the DRX-on period, or can be any time during the DRX-off period, or can be the time of any PDCCH detection time unit. The end time of the PDCCH detection window can be any time during the DRX-on period, or can be any time during the DRX-off period, or can be the time of any PDCCH detection time unit. The DRX can be configured periodically or non-periodically. Further, the terminal may not configure the DRX, and the terminal is awakened in any PDCCH detection window to detect the PDCCH.

In embodiments of the present application, the continuous detection may be performed in the PDCCH detection window, or the PDCCH detection may be performed in the PDCCH detection time unit within the PDCCH detection window. The PDCCH detection window information further includes the position(s) of at least one PDCCH detection time unit in the PDCCH detection window, and/or the number of PDCCH detection time units in the PDCCH detection window, and/or the interval of the PDCCH detection time units in the PDCCH detection window.

Here, the PDCCH detection window may include one PDCCH detection time unit or multiple PDCCH detection time units, so the PDCCH detection window information further includes the number of PDCCH detection time units in the PDCCH detection window.

If there are multiple PDCCH detection time units, the multiple PDCCH detection time units may be continuous in time or discontinuous in time. Therefore, the PDCCH detection window information further includes the interval of the PDCCH detection time units in the PDCCH detection window.

The multiple PDCCH detection time units include a PDCCH detection start time unit and a PDCCH detection end time unit. Therefore, the position(s) of at least one PDCCH detection time unit in the PDCCH detection window information include(s) the position of the PDCCH detection start time unit and the position of the PDCCH detection end time unit.

In addition, the number of PDCCH detection time units may be configured by the base station according to service characteristics, or may be configured according to the scheduling result of the base station. For example, if the transmission time interval of the service type is relatively short, the number of configured PDCCH detection time units may be less; if the transmission time interval of the transmission service type is relatively long, the number of configured PDCCH detection time units may be more.

The above PDCCH detection time unit may be a slot, or a symbol, or a subframe, or a radio frame, etc., which is not limited in the present application.

In the embodiments of the present application, the energy-saving configuration information and the PDCCH detection window may be configured by a base station or a terminal, or may be pre-agreed by a system.

That is to say, the step 401 in which the base station determines the energy-saving configuration information of the terminal includes:
the base station receives the energy-saving configuration information configured by the terminal autonomously;
or, the base station configures the energy-saving configuration information for the terminal and sends the energy-saving configuration information to the terminal;
or, the base station pre-appoints the energy-saving configuration information with the terminal.

The step 402 in which the base station determines the PDCCH detection window information includes:
the base station receives the PDCCH detection window information configured by the terminal autonomously;
or, the base station configures the PDCCH detection window information for the terminal and sends the PDCCH detection window information to the terminal;
or, the base station pre-appoints the PDCCH detection window information with the terminal.

Correspondingly, the step 403 in which the terminal determines the energy-saving configuration information of the terminal includes:
the terminal receives the energy-saving configuration information configured by the base station for the terminal;
or, the terminal configures the energy-saving configuration information autonomously and sends the energy-saving configuration information to the base station;
or, the terminal pre-appoints the energy-saving configuration information with the base station.

The step 404 in which the terminal determines the PDCCH detection window information includes:
the terminal receives the PDCCH detection window information configured by the base station for the terminal;
or, the terminal configures the PDCCH detection window information autonomously and sends the PDCCH detection window information to the base station;
or, the terminal pre-appoints the PDCCH detection window information with the base station.

Further, in the embodiments of the present application, the configuration mode of the energy-saving configuration information is not limited, and may be static configuration, or semi-static configuration, or dynamic configuration.

Similarly, the configuration mode of the PDCCH detection window information may be static configuration, or semi-static configuration, or dynamic configuration.

Here, the static configuration is to configure based on the RRC signaling, or is pre-agreed. The semi-static configuration is to configure based on the RRC signaling or MAC layer signaling. The dynamic configuration is to configure based on the DCI.

In the embodiments of the present application, the PDCCH detection indication information refers to a signal used to wake up the terminal, which may be a WUS, or may be a DCI signal, or may be carried on the PDCCH. Specifically, the PDCCH detection indication information may be the information carried in a scrambled manner based on a radio network temporary identity (RNTI), or information carried in the content of a PDCCH indication.

Furthermore, in the embodiments of the present application, the sending timing of the PDCCH detection indication information is not limited.

The step 405 in which the base station sends the PDCCH detection indication information to the terminal includes:
the base station sends the PDCCH detection indication information corresponding to a PDCCH detection window in a first time unit before the PDCCH detection window;

or the base station sends the PDCCH detection indication information corresponding to the PDCCH detection window in a second time unit at the start of the PDCCH detection window;

or the base station sends the PDCCH detection indication information corresponding to the PDCCH detection window in a third time unit within the PDCCH detection window;

or the base station sends the PDCCH detection indication information corresponding to a next PDCCH detection window in a fourth time unit within the PDCCH detection window;

or the base station sends the PDCCH detection indication information corresponding to a next PDCCH detection window in a fifth time unit at the end of the PDCCH detection window.

The time unit here may be a slot, or a symbol, or a subframe, or a radio frame, etc., which is not limited in the embodiments of the present application.

Figure 5:
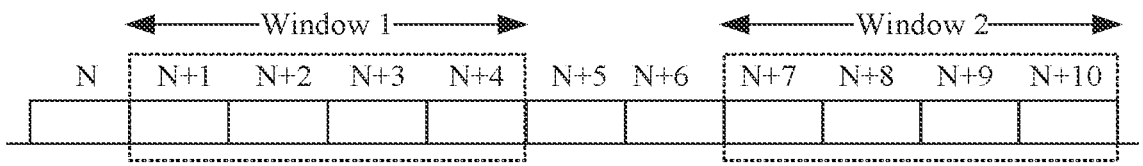
FIG. 5 shows a schematic diagram of a time unit for sending PDCCH detection indication information in an embodiment of the present application.

FIG. 5 shows a schematic diagram of a time unit for sending PDCCH detection indication information in an embodiment of the present application. In a possible specific implementation process, PDCCH detection window 1 (hereinafter referred to as window 1) and PDCCH detection window 2 (hereinafter referred to as window 2) are discontinuous detection windows as an example, where window 1 includes 4 time units, window 2 includes 4 time units, window 1 and window 2 are separated by 2 time units, a time unit before window 1 is represented by N, and time units after the time unit N are represented by (N+1) to (N+10) in sequence.

As shown in FIG. 5, PDCCH detection indication information corresponding to window 1 may be sent in the $N^{th}$ time unit, to indicate whether to perform PDCCH detection in window 1 or indicate whether to perform PDCCH detection in each time unit in window 1. It is also possible to send PDCCH detection indication information corresponding to window 1 in any one of the $(N+1)^{th}$ to $(N+3)^{th}$ time units, to indicate whether to perform PDCCH detection in subsequent time units in window 1. It is also possible to send PDCCH detection indication information corresponding to window 2 in any one of the $(N+2)^{th}$ to $(N+4)^{th}$ time units, to indicate whether to perform PDCCH detection in window 2 or indicate whether to perform PDCCH detection in each time unit in window 2. Similarly, it is possible to send PDCCH detection indication information corresponding to window 2 in the $(N+5)^{th}$ or $(N+6)^{th}$ time unit, to indicate whether to perform PDCCH detection in window 2 or indicate whether to perform PDCCH detection in each time unit in window 2. It is also possible to send PDCCH detection indication information corresponding to window 2 in any one of the $(N+7)^{th}$ to $(N+9)^{th}$ time units, to indicate whether to perform PDCCH detection in subsequent time units in window 2.

The corresponding terminal side also performs reception in the same manner, which is not repeated in the embodiments of the present application.

In order to understand the present application more clearly, the specific embodiments are used below to describe the foregoing processes in detail.

First Embodiment

Figure 6A:
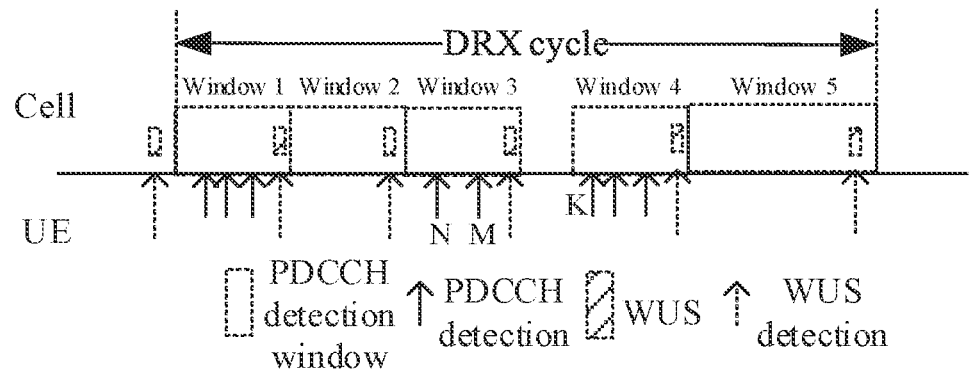
FIG. 6A shows a schematic diagram of a PDCCH detection indication in a first embodiment of the present application.

FIG. 6A shows a schematic diagram of PDCCH detection indication in the first embodiment of the present application. In the first embodiment, the wake-up mechanism in the terminal is the wake-up mechanism based on the WUS transmission and reception. Five PDCCH detection windows are defined in a DRX cycle, which are window 1 to window 5 respectively, where the durations of the window 1 to window 4 are the same and are all P, the duration of window 5 is Q, and P is less than Q. Window 1 to window 3 are continuous windows, window 4 and window 5 are continuous windows, and there is a time interval between window 3 and window 4. The base station sends a WUS to the terminal at the moment before each window, to instruct the terminal whether to perform PDCCH detection in the corresponding window, and the specific moment to perform PDCCH detection.

Step 601: the base station determines that the terminal is configured to support energy-saving configuration, and the base station configures a wake-up mechanism and PDCCH detection window information for the terminal and sends the wake-up mechanism and PDCCH detection window information to the terminal.

Step 602: the base station sends a WUS1 to the terminal at the moment before window 1 according to the PDCCH detection window information, where the WUS1 instructs the terminal to detect PDCCH in window 1, and the PDCCH is required to be detected in each slot in window 1. According to the received WUS1, the terminal detects the PDCCH in window 1.

Step 603: the base station sends a WUS2 to the terminal at the moment before window 2, where the WUS2 instructs the terminal not to detect PDCCH in window 2. According to the received WUS2, the terminal stays in the sleep state and does not detect the PDCCH in the duration of window 2.

Step 604: the base station sends a WUS3 to the terminal at the moment before window 3, where the WUS3 instructs the terminal to detect PDCCH in two slots in window 3, which are N and M respectively. According to the received WUS3, the terminal detects the PDCCH in the slot N and the slot M.

Step 605: the base station sends a WUS4 to the terminal at the moment before window 4, where the WUS4 indicates the terminal that the start time of window 4 is K and the PDCCH needs to be detected in window 4. According to the received WUS4, the terminal starts PDCCH detection when the time K arrives.

Step 606: the base station sends a WUS5 to the terminal at the moment before window 5, where the WUS5 indicates the terminal that the duration of window 5 is Q, and Q is greater than the configured window duration P and the terminal does not need to detect PDCCH in window 5. According to the received WUS5, the terminal stays in the sleep state and does not perform PDCCH detection in the duration of window 5.

Second Embodiment

Figure 6B:
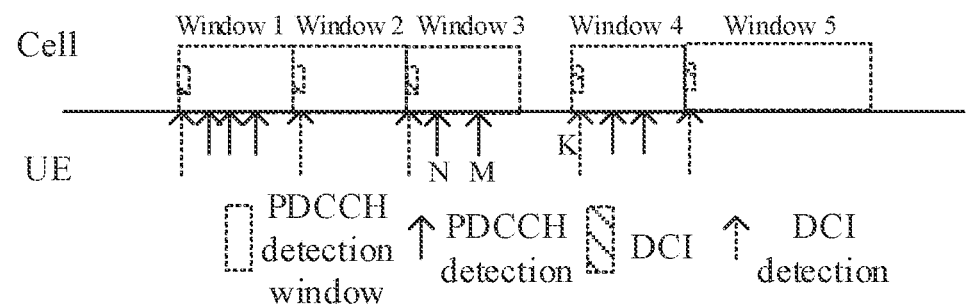
FIG. 6B shows a schematic diagram of a PDCCH detection indication in a second embodiment of the present application.

FIG. 6B shows a schematic diagram of a PDCCH detection indication in the second embodiment of the present application. In the second embodiment, the wake-up mechanism in the terminal is a wake-up mechanism based on DCI detection. In the second embodiment, the DRX of the terminal is configured aperiodically or is not configured as the DRX state, that is, PDCCH detection in the embodiments of the present application can also be performed in the aperiodic and discontinuous reception process. In the second embodiment, five PDCCH detection windows are defined, which are window 1 to window 5 respectively, where the durations of window 1 to window 4 are the same and are all P, the duration of window 5 is Q, and P is less than Q. Window 1 to window 3 are continuous windows, window 4 and window 5 are continuous windows, and there is a time interval between window 3 and window 4. The base station sends a DCI to the terminal at the start time of each window, to instruct the terminal whether to perform PDCCH detection in the corresponding window, and the specific moment to perform PDCCH detection.

Step 701: the terminal determines to support an energy-saving configuration, and the terminal configures a wake-up mechanism and PDCCH detection window information by itself and feeds back the wake-up mechanism and PDCCH detection window information to the base station.

Step 702: the terminal receives a DCI 1 sent by the base station at the start time of window 1 according to the PDCCH detection window information. The DCI 1 instructs the terminal to detect PDCCH in window 1, and window 1 includes 4 slots, where there is a need to detect PDCCH in each slot. According to the received DCI 1, the terminal performs PDCCH detection in window 1.

Step 703: the terminal receives a DCI 2 sent by the base station at the start time of window 2. The DCI 2 instructs the terminal not to detect PDCCH in window 2. According to the received DCI 2, the terminal stays in the sleep state and does not perform PDCCH detection in the duration of window 2.

Step 704: the terminal receives a DCI 3 sent by the base station at the start time of window 3. The DCI 3 indicates the terminal that window 3 contains 4 slots and there is a need to detect PDCCH in two slots which are N and M respectively. According to the received DCI3, the terminal performs PDCCH detection in the slot N and slot M.

Step 705: the terminal receives a DCI 4 sent by the base station at the start time of window 4, where the DCI 4 indicates the terminal that the start time of window 4 is K and PDCCH needs to be detected in window 4. According to the received DCI4, the terminal starts PDCCH detection w % ben the time K arrives.

Step 706: the terminal receives a DCI 5 sent by the base station at the start time of window 5, where the DCI 5 indicates the terminal that the duration of window 5 is Q which greater than the configured window duration P and the terminal does not need to detect the PDCCH in window 5. According to the received DCI5, the terminal stays in the sleep state and does not perform PDCCH detection in the duration of window 5.

Figure 7:
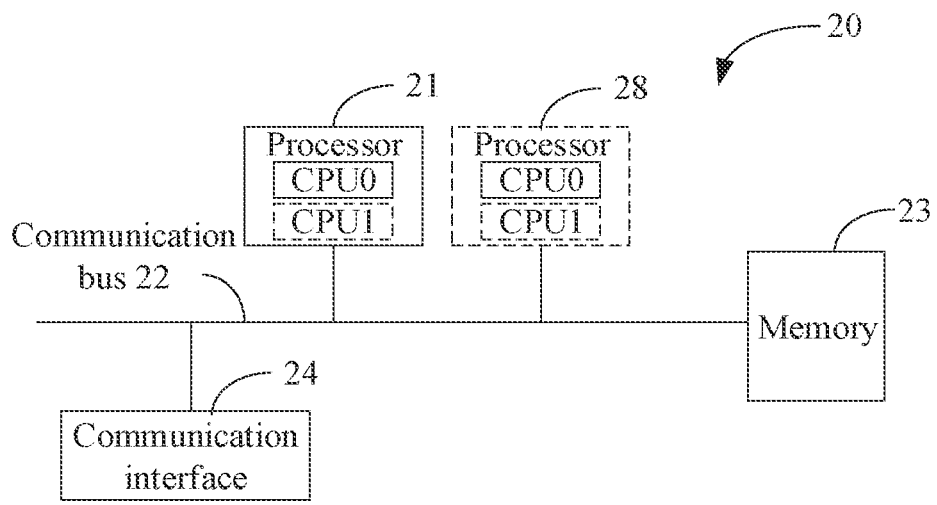
FIG. 7 is a structural schematic diagram of a device provided by an embodiment of the present application.

Based on the same application concept, as shown in FIG. 7, a device 20 provided by an embodiment of the present application includes at least one processor 21, a communication bus 22, a memory 23, and at least one communication interface 24.

Exemplarily, the terminal 200 in FIG. 1 may also be the device 20 shown in FIG. 7. The device 20 may implement the steps related to the terminal in the feedback method of channel state information in the embodiments of the present application through the processor 21.

Exemplarily, the base station 100 in FIG. 1 may also be the device 20 shown in FIG. 7, and the device 20 may implement the steps related to the network device in the feedback method of channel state information in the embodiments of the present application through the processor 21.

The processor 21 may be a general-purpose central processing unit (CPU), a microprocessor, an application-specific integrated circuit (ASIC), or one or more integrated circuits for controlling the program execution of the solution of the present application.

The communication bus 22 may include a path for transferring information among the aforementioned components.

The communication interface 24 uses any device such as a transceiver to communicate with other devices or communication networks, such as Ethernet, radio access network (RAN), wireless local area network (WLAN), etc.

The memory 23 may be a read-only memory (ROM) or other type of static storage device that can store static information and instructions, a random access memory (RAM) or other type of dynamic storage device that can store information and instructions, or may be an electrically erasable programmable read-only memory (EEPROM), compact disc read-only memory (CD-ROM) or other compact disc storage, a compact disk storage (including compact disk, laser disk, optical disk, digital versatile disk, Blu-ray disk, etc.), a magnetic disk storage medium or other magnetic storage device, or any other medium that can be used to carry or store desired program codes in the form of instructions or data structures and can be accessed by the device, but is not limited to thereto. The memory can exist independently and is connected to the processor through a bus. The memory can also be integrated with the processor.

Here, the memory 23 is used to store application program codes for executing the solution of the present application, and the execution is controlled by the processor 21. The processor 21 is configured to execute the application program codes stored in the memory 23.

In a specific implementation, as an embodiment, the processor 21 may include one or more CPUs, e.g., CPU0 and CPU1 as shown in FIG. 7.

Figure 8:
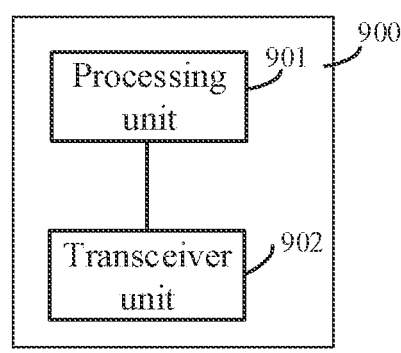
FIG. 8 is a structural schematic diagram of another device provided by an embodiment of the present application.

In specific implementation, as an embodiment, the device 20 may include a plurality of processors, e.g., the processor 21 and processor 28 as shown in FIG. 8. Each of these processors may be a single-core (single-CPU) processor or a multi-core (multi-CPU) processor. The processor here may refer to one or more devices, circuits, and/or processing cores for processing data (for example, computer program instructions).

The embodiments of the present application can perform the functional module division on the device shown in FIG. 7 according to the foregoing method examples. For example, each functional module can be divided for each function, or two or more functions can be integrated into one processing module. The above-mentioned integrated modules can be implemented in the form of hardware, or can be implemented in the form of software functional modules. It should be noted that the division of modules in the embodiment of the present application is illustrative, and is merely a kind of logical function division, and there may be other division methods in actual implementations.

In this embodiment, the device shown in FIG. 7 is presented in the form of dividing each functional module corresponding to each function, or the device is presented in the form of dividing each functional module in an integrated manner. The "module" here can refer to an application-specific integrated circuit (ASIC), a circuit, a processor that executes one or more software or firmware programs and a memory, an integrated logic circuit, and/or other device that can provide the aforementioned functions.

For example, in the case of dividing each functional module corresponding to each function, FIG. 8 shows a possible structural schematic diagram of the device involved in the foregoing embodiment, where the device 900 may be a terminal or a network device in the foregoing embodiment. The device 900 includes a processing unit 901 and a transceiver unit 902. The transceiver unit 902 is used by the processing unit 901 to receive and send signals. The method executed by the processing unit 901 in FIG. 8 may be implemented by the processor 21 (and/or processor 28) and the memory 23 in FIG. 7. Specifically, the method executed by the processing unit 901 may be implemented by the processor 21 (and/or processor 28) to invoke the application program codes stored in the memory 23 for execution, which is not limited in the embodiments of the present application.

In a specific implementation, the device 900 may be the terminal in the foregoing embodiments as an example. An embodiment of the present application provides an information receiving device, including:

a processing unit 901 configured to determine the energy-saving configuration information, and determine the PDCCH detection window information; and a transceiver unit 902 configured to receive the PDCCH detection indication information according to the PDCCH detection window information on the basis of the energy-saving configuration information.

In a possible implementation, the processing unit 901 is specifically configured to perform PDCCH detection according to the PDCCH detection window information on the basis of the PDCCH detection indication information.

In a possible implementation, the energy-saving configuration information includes:

whether the terminal has the ability to support the energy-saving configuration, and/or whether the terminal is configured to support the energy-saving configuration, and/or an energy-saving mechanism of the terminal, and/or a wake-up mechanism of the terminal.

In a possible implementation, the PDCCH detection window information includes:

the wake-up mechanism of the terminal, and/or the start time of a PDCCH detection window, and/or the duration of the PDCCH detection window, and/or the end time of the PDCCH detection window, and/or the position of at least one PDCCH detection time unit in the PDCCH detection window, and/or the number of PDCCH detection time units in the PDCCH detection window, and/or the interval of PDCCH detection time units in the PDCCH detection window.

In a possible implementation, the transceiver unit 902 is further configured to: receive the energy-saving configuration information configured by the base station for the terminal;

or, send the energy-saving configuration information to the base station.

The transceiving unit 902 is further configured to: receive the PDCCH detection window information configured by the base station for the terminal;

or, send the PDCCH detection window information to the base station.

In a possible implementation, the configuration mode of the energy-saving configuration information is static configuration, or semi-static configuration, or dynamic configuration; and/or, the configuration mode of the PDCCH detection window information is static configuration, or semi-static configuration, or dynamic configuration.

In a possible implementation, the transceiver unit 902 is specifically configured to:

receive the PDCCH detection indication information corresponding to a PDCCH detection window in a first time unit before the PDCCH detection window;

or receive the PDCCH detection indication information corresponding to the PDCCH detection window in a second time unit at the start of the PDCCH detection window;

or receive the PDCCH detection indication information corresponding to the PDCCH detection window in a third time unit within the PDCCH detection window;

or receive the PDCCH detection indication information corresponding to a next PDCCH detection window in a fourth time unit within the PDCCH detection window;

or receive the PDCCH detection indication information corresponding to a next PDCCH detection window in a fifth time unit at the end of the PDCCH detection window.

Figure 9:
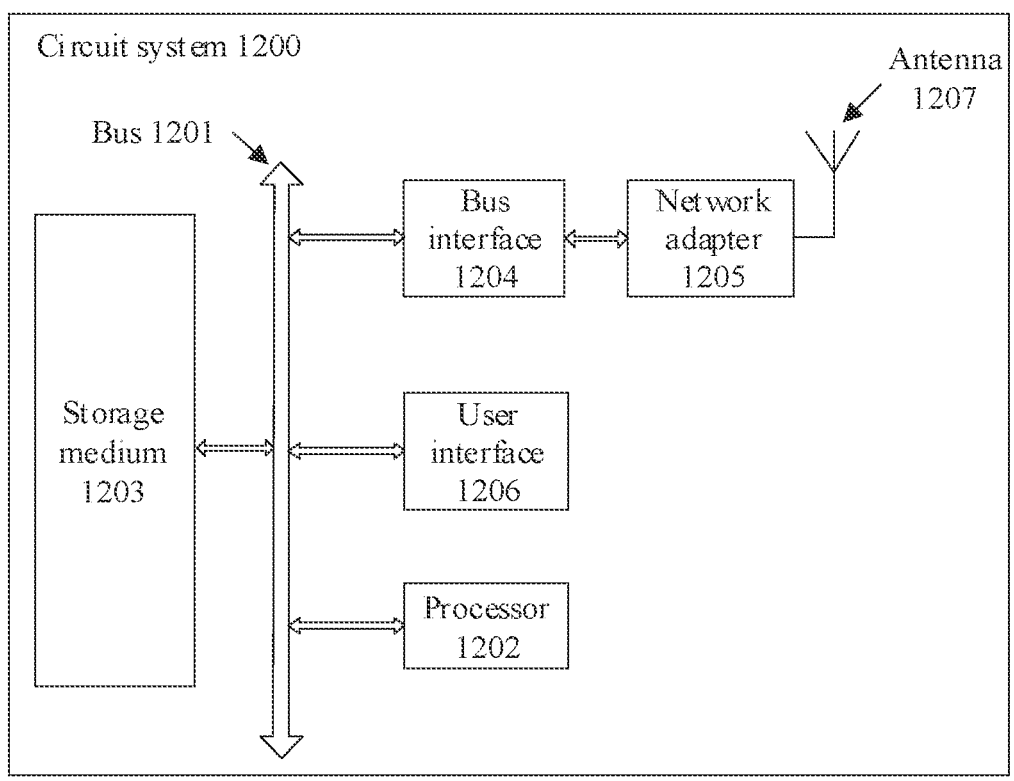
FIG. 9 is a structural schematic diagram of a circuit system provided by an embodiment of the present application.

Based on the same application concept, an embodiment of the present application further provides a circuit system. FIG. 9 is a structural schematic diagram of the circuit system provided in the embodiment of the present application (for example, access point or base station, station or terminal, or other communication devices).

As shown in FIG. 9, the circuit system 1200 can be implemented by a bus 1201 as a general bus architecture. According to the specific application and the overall design constraints of the circuit system 1200, the bus 1201 may include any number of interconnected buses and bridges. The bus 1201 connects various circuits together, where these circuits include a processor 1202, a storage medium 1203 and a bus interface 1204. Optionally, the circuit system 1200 uses the bus interface 1204 to connect the network adapter 1205 and the like via the bus 1201. The network adapter 1205 can be used to realize the signal processing function of the physical layer in the wireless communication network, and realize the sending and receiving of radio frequency signals through an antenna 1207. A user interface 1206 can be connected to a user terminal, for example, keyboard, display, mouse or joystick, etc. The bus 1201 can also connect various other circuits, such as timing source, peripheral device, voltage regulator or power management circuit, etc., where these circuits are well-known in the art and thus will not be described in detail.

Alternatively, the circuit system 1200 may also be configured as a chip or a system on chip, which includes: one or more microprocessors that provide processor functions; and an external memory that provides at least a part of the storage medium 1203. All of these are connected with other supporting circuits through an external bus architecture.

Alternatively, the circuit system 1200 may be implemented by: an application-specific integrated circuit (ASIC) having the processor 1202, bus interface 1204 and user interface 1206; and at least a part of the storage medium 1203 integrated in a single chip, or the circuit system 1200 may be implemented by: one or more field programmable gate arrays (FPGAs), programmable logic devices (PLDs), controllers, state machines, gate logics, discrete hardware components, any other suitable circuits, or any combination of circuits capable of performing various functions described throughout the present application.

Here, the processor 1202 is responsible for managing the bus and general processing (including: executing the software stored on the storage medium 1203). The processor 1202 may be implemented by using one or more general-purpose processors and/or special-purpose processors. Examples of the processor include microprocessor, microcontroller, DSP processor, and other circuits capable of executing the software. The software should be interpreted broadly to represent instructions, data, or any combination thereof, regardless of whether it is called software, firmware, middleware, microcode, hardware description language, or other.

In the following figure, the storage medium 1203 is shown as being separated from the processor 1202. However, those skilled in the art can easily understand that the storage medium 1203 or any part thereof may be located outside the circuit system 1200. For example, the storage medium 1203 may include a transmission line, a carrier waveform modulated with data, and/or a computer product separated from a wireless node, all of which may be accessed by the processor 1202 through the bus interface 1204. Alternatively, the storage medium 1203 or any part thereof may be integrated into the processor 1202, for example, may be a cache and/or a general register.

The processor 1202 can perform the feedback method of signal state information in any one of the foregoing embodiments of the present application, and the specific content will not be repeated here.

Figure 10:
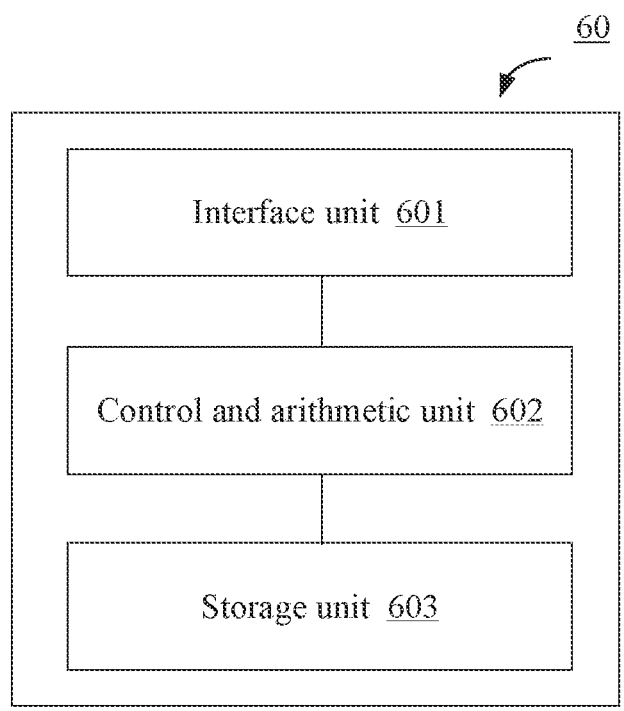
FIG. 10 is a structural schematic diagram of another circuit system provided by an embodiment of the present application.

FIG. 10 is another structural schematic diagram of a circuit system of an embodiment of the present application. The circuit system may be a processor. The processor may be embodied as a chip or a system on chip (SOC), and is set in the base station or terminal of the wireless communication system of the embodiments of the present application, so that the base station or terminal realizes the feedback method of channel state information of the embodiments of the present application. As shown in FIG. 10, the circuit system 60 includes: an interface unit 601, a control and arithmetic unit 602, and a storage unit 603, wherein the interface unit is configured to communicate with other components of the base station or terminal, the storage unit 603 is configured to store computer programs or instructions, and the control and arithmetic unit 602 is configured to decode and execute these computer programs or instructions. It should be understood that these computer programs or instructions may include the aforementioned function programs of the terminal, and may also include the aforementioned function programs of the base station. When the function programs of the terminal are decoded and executed by the control and arithmetic unit 602, the terminal can be enabled to implement the functions of the terminal in the indication method of uplink subband precoding matrix of the embodiments of the present application. When the function programs of the base station are decoded and executed by the control and arithmetic unit 602, the base station can be enabled to implement the functions of the base station in the information sending method of the embodiments of the present application.

In a possible design, these function programs of the terminal or function programs of the base station are stored in a memory outside the circuit system 60. When the function programs of the terminal or the function programs of the base station described above are decoded and executed by the control and arithmetic unit 602, the storage unit 603 temporarily stores a part or all of the function programs of the terminal, or temporarily stores a part or all of the function programs of the base station.

In another optional implementation, these function programs of the terminal or function programs of the base station are set in the storage unit 603 stored inside the circuit system 60. When the function programs of the terminal are stored in the storage unit 603 inside the circuit system 60, the circuit system 60 may be set in the terminal 200 of the wireless communication system of the embodiments of the present application. When the function programs of the base station are stored in the storage unit 603 inside the circuit system 60, the circuit system 60 may be set in the base station 100 of the wireless communication system of the embodiments of the present application.

In yet another optional implementation, some content of these function programs of the terminal or function programs of the base station is stored in a memory outside the circuit system 60, and the other content of these function programs of the terminal or function programs of the base station is stored in the storage unit 603 inside the circuit system 60.

Based on the same concept, the present application provides a computer readable storage medium storing instructions, that cause a computer to perform the methods steps related to the terminal in various embodiments involved in the present application when running on the computer.

Based on the same concept, the present application provides a computer readable storage medium storing instructions, that cause a computer to perform the methods steps related to the base station in various embodiments involved in the present application when running on the computer.

Based on the same concept, the present application provides a computer program product containing instructions, that cause a computer to perform the methods steps related to the terminal in various embodiments involved in the present application when running on the computer.

Based on the same concept, the present application provides a computer program product containing instructions, that cause a computer to perform the methods steps related to the base station in various embodiments involved in the present application when running on the computer.

The above embodiments may be implemented in whole or in part by software, hardware, firmware or any combination thereof. When implemented by software, they may be implemented in the form of a computer program product in whole or in part. The computer program product includes one or more computer instructions. When the computer program instructions are loaded and executed on a computer, the processes or functions described in the embodiments of the present application are generated in whole or in part. The computer may be a general-purpose computer, a special-purpose computer, a computer network, or other programmable devices. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, wireless, microwave, etc.) way. The computer readable storage medium may be any available medium that can be accessed by a computer, or a data storage device such as server or data center that is integrated with one or more available media. The available medium may be a magnetic medium (for example, floppy disk, hard disk, magnetic tape), an optical medium (for example, DVD), or a semiconductor medium (for example, Solid State Disk (SSD)), etc.

As can be understood clearly by those skilled in the art, the descriptions of the embodiments provided by the present application can be cross-referenced, and for the convenience and simplicity of description, the functions of and the steps performed by the apparatuses and devices provided in the embodiments of the present application can refer to the relevant description of the method embodiments of the present application, and will be omitted here.

Although the present application is described in combination with various embodiments, those skilled in the art can understand and realize other changes of the disclosed embodiments by viewing the drawings, the disclosure and the appended claims in the process of implementing the claimed application. In the claims, the word "including"

does not exclude other components or steps, and "a" or "one" does not exclude multiple. A single processor or other unit can implement several functions listed in the claims. Certain measures are recorded in dependent claims different from each other, but this does not mean that these measures cannot be combined to produce the good effects.

It should be understood by those skilled in the art that the embodiments of the present application may be provided as methods, apparatuses (devices) and computer program products. Thus, the present application can take the form of hardware embodiments alone, software embodiments alone, or embodiments combining the software and hardware aspects, which are collectively referred to herein as "module" or "system". Also the present application can take the form of computer program products implemented on one or more computer usable storage mediums (including but not limited to magnetic disk memories, CD-ROMs, optical memories and the like) containing computer usable program codes therein. The computer program is stored/distributed in a suitable medium, and is provided together with other hardware or as a part of the hardware, or may be distributed in other forms, such as through the Internet or other wired or wireless telecommunication systems.

Those skilled in the art can also understand that various illustrative logical blocks and steps listed in the embodiments of the present application can be implemented by electronic hardware, computer software, or a combination thereof. In order to clearly demonstrate the interchangeability of hardware and software, various illustrative components and steps described above have generally described their functions. Whether such a function is implemented by hardware or software depends on the specific application and the design requirement of the entire system. Those skilled in the art can use various methods to implement the described functions for each specific application, but such implementation should not be understood as going beyond the protection scope of the embodiments of the present application.

Various illustrative logic blocks, modules and circuits described in the embodiments of the present application can implement or operate the described functions by the general processing unit, digital signal processing unit, Application Specific Integrated Circuit (ASIC), Field-Programmable Gate Array (FPGA) or other programmable logic device, discrete gate or transistor logic, discrete hardware component, or any combination design thereof. The general processing unit may be a micro processing unit, and optionally, the general processing unit may also be any traditional processing unit, controller, microcontroller, or state machine. The processing unit can also be realized by a combination of computing devices, e.g., a digital signal processing unit and a micro processing unit, a plurality of micro processing units, one or more micro processing units combined with a digital signal processing unit core, or any other similar configuration.

In one or more exemplary designs, the foregoing functions described in the embodiments of the present application may be implemented by hardware, software, firmware, or any combination thereof. If implemented by software, these functions can be stored on a computer readable medium, or transmitted on the computer readable medium in the form of one or more instructions or codes. The computer readable media include the computer storage media and the communication media that facilitate the transfer of computer programs from one place to another. The storage medium can be any available medium that can be accessed by general or special computers. For example, such computer readable media may include but not limited to: RAM, ROM, EEPROM, CD-ROM or other optical disk storage, magnetic disk storage or other magnetic storage devices, or any other media that can be used to carry or store program codes in the form of instruction or data structure and in other form that can be read by general or special computers or general or special processing units. In addition, any connection can be appropriately defined as a computer readable medium, for example, if the software is transmitted from a website, server or other remote source through a coaxial cable, fiber optic computer, twisted pair, Digital Subscriber Line (DSL) or by wireless means such as infrared, wireless and microwave, then it is also included in the defined computer readable medium. The disks and discs include the compressed magnetic disk, laser disk, optical disk, DVD, floppy disk, and Blu-ray disk. The discs usually copy data magnetically, while the disks usually copy data optically with laser. The combination of the above can also be included in the computer readable medium.

The above description in the specification of the present application can enable any technology in the art to utilize or realize the content of the present application, any modification based on the disclosed content should be considered to be obvious in the art, and the basic principle described in the present application can be applied to other variants without departing from the essence and scope of the present application. Therefore, the content disclosed in the present application is not merely limited to the described embodiments and designs, and can also be extended to the maximum range consistent with the principle of the present application and the new features disclosed.

What is claimed is:

1. A method for sending information, comprising:
    determining, by a base station, energy-saving configuration information of a terminal;
    determining, by the base station, physical downlink control channel (PDCCH) detection window information; and
    sending, by the base station, PDCCH detection indication information to the terminal based on the energy-saving configuration information of the terminal and the PDCCH detection window information;
    wherein the PDCCH detection window information comprises:
    a quantity of PDCCH detection time units in a PDCCH detection window; and/or
    an interval of PDCCH detection time units in a PDCCH detection window;
    wherein a configuration mode of the PDCCH detection window information is dynamic configuration.

2. The method according to claim 1, wherein the energy-saving configuration information comprises at least one of following information:
    whether the terminal has an ability to support an energy-saving configuration;
    whether the terminal is configured to support an energy-saving configuration;
    an energy-saving mechanism of the terminal; or
    a wake-up mechanism of the terminal.

3. The method according to claim 1, wherein the PDCCH detection window information further comprises at least one of following information:
    a wake-up mechanism of the terminal;
    start time of a PDCCH detection window;
    duration of a PDCCH detection window;
    end time of a PDCCH detection window; or a position of at least one PDCCH detection time unit in a PDCCH detection window.

4. The method according to claim 1, wherein the determining, by the base station, the energy-saving configuration information of the terminal, comprises:
receiving, by the base station, the energy-saving configuration information configured by the terminal autonomously; or
configuring, by the base station, the energy-saving configuration information for the terminal and sending the energy-saving configuration information to the terminal; or
pre-appointing, by the base station, the energy-saving configuration information with the terminal.

5. The method according to claim 1, wherein the determining, by the base station, the PDCCH detection window information, comprises:
receiving, by the base station, the PDCCH detection window information configured by the terminal autonomously; or
configuring, by the base station, the PDCCH detection window information for the terminal and sending the PDCCH detection window information to the terminal; or
pre-appointing, by the base station, the PDCCH detection window information with the terminal.

6. The method according to claim 1, wherein a configuration mode of the energy-saving configuration information is static configuration, or semi-static configuration, or dynamic configuration.

7. The method according to claim 1, wherein sending, by the base station, the PDCCH detection indication information to the terminal, comprises:
sending, by the base station, the PDCCH detection indication information corresponding to a PDCCH detection window in a first time unit before the PDCCH detection window; or
sending, by the base station, the PDCCH detection indication information corresponding to a PDCCH detection window in a second time unit at the start of the PDCCH detection window; or
sending, by the base station, the PDCCH detection indication information corresponding to a PDCCH detection window in a third time unit within the PDCCH detection window; or
sending, by the base station, the PDCCH detection indication information corresponding to a next PDCCH detection window in a fourth time unit within a PDCCH detection window; or
sending, by the base station, the PDCCH detection indication information corresponding to a next PDCCH detection window in a fifth time unit at the end of a PDCCH detection window.

8. A method for receiving information, comprising:
determining, by a terminal, energy-saving configuration information;
determining, by the terminal, physical downlink control channel (PDCCH) detection window information; and
receiving, by the terminal, PDCCH detection indication information based on the energy-saving configuration information and the PDCCH detection window information;
wherein the PDCCH detection window information comprises;
a quantity of PDCCH detection time units in a PDCCH detection window; and/or
an interval of PDCCH detection time units in a PDCCH detection window;
wherein a configuration mode of the PDCCH detection window information is dynamic configuration.

9. The method according to claim 8, wherein after the terminal receives the PDCCH detection indication information based on the energy-saving configuration information and the PDCCH detection window information, the method further comprises:
performing, by the terminal, a PDCCH detection based on the PDCCH detection indication information and the PDCCH detection window information.

10. The method according to claim 8, wherein the energy-saving configuration information comprises at least one of following information:
whether the terminal has an ability to support an energy-saving configuration;
whether the terminal is configured to support an energy-saving configuration;
an energy-saving mechanism of the terminal; or
a wake-up mechanism of the terminal.

11. The method according to claim 8, wherein the PDCCH detection window information further comprises at least one of following information:
a wake-up mechanism of the terminal;
start time of a PDCCH detection window;
duration of a PDCCH detection window;
end time of a PDCCH detection window; or
a position of at least one PDCCH detection time unit in a PDCCH detection window.

12. The method according to claim 8, wherein the determining, by the terminal, the energy-saving configuration information of the terminal, comprises:
receiving, by the terminal, the energy-saving configuration information configured by the base station for the terminal; or
configuring, by the terminal, the energy-saving configuration information autonomously and sending the energy-saving configuration information to the base station; or
pre-appointing, by the terminal, the energy-saving configuration information with the base station.

13. The method according to claim 8, wherein the determining, by the terminal, the PDCCH detection window information, comprises:
receiving, by the terminal, the PDCCH detection window information configured by the base station for the terminal; or
configuring, by the terminal, the PDCCH detection window information autonomously and sending the PDCCH detection window information to the base station; or
pre-appointing, by the terminal, the PDCCH detection window information with the base station.

14. The method according to claim 8, wherein a configuration mode of the energy-saving configuration information is static configuration, or semi-static configuration, or dynamic configuration.

15. The method according to claim 8, wherein the receiving, by the terminal, the PDCCH detection indication information sent by a base station, comprises:
receiving, by the terminal, the PDCCH detection indication information corresponding to a PDCCH detection window in a first time unit before the PDCCH detection window; or receiving, by the terminal, PDCCH detection indication information corresponding to a PDCCH detection window in a second time unit at the start of the PDCCH detection window; or receiving, by the terminal, the PDCCH detection indication information corresponding to a PDCCH detection window in a third time unit within the PDCCH detection window; or receiving, by the terminal, the PDCCH detection indication information corresponding to a next PDCCH detection window in a fourth time unit within a PDCCH detection window; or receiving, by the terminal, the PDCCH detection indication information corresponding to a next PDCCH detection window in a fifth time unit at the end of a PDCCH detection window.

16. A terminal, comprising: a processor and a memory, wherein the processor is configured to read and execute one or more executable programs stored in the memory to perform the method of claim 8.

17. A base station, comprising: a processor, a memory, a transceiver and a bus interface, wherein the processor, the memory and the transceiver are connected through the bus interface;

the processor is configured to determine energy-saving configuration information of a terminal, and determine physical downlink control channel (PDCCH) detection window information;

the transceiver is configured to send PDCCH detection indication information to the terminal based on the energy-saving configuration information of the terminal and the PDCCH detection window information;

the memory is configured to store one or more executable programs and store data used by the processor when performing operations; and the bus interface is configured to provide one or more interfaces;

wherein the PDCCH detection window information comprises;

a quantity of PDCCH detection time units in a PDCCH detection window; and/or an interval of PDCCH detection time units in a PDCCH detection window;

wherein a configuration mode of the PDCCH detection window information is dynamic configuration.

* * * * *